(12) United States Patent
Tanaka et al.

(10) Patent No.: US 8,013,943 B2
(45) Date of Patent: Sep. 6, 2011

(54) DISPLAY DEVICE

(75) Inventors: Shinya Tanaka, Mie (JP); Yoshiharu Kataoka, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 579 days.

(21) Appl. No.: 12/093,489

(22) PCT Filed: Sep. 28, 2006

(86) PCT No.: PCT/JP2006/319303
§ 371 (c)(1),
(2), (4) Date: May 13, 2008

(87) PCT Pub. No.: WO2007/102238
PCT Pub. Date: Sep. 13, 2007

(65) Prior Publication Data
US 2009/0046077 A1  Feb. 19, 2009

(30) Foreign Application Priority Data

Mar. 8, 2006  (JP) ................................ 2006-063093

(51) Int. Cl.
*G02F 1/1335* (2006.01)
*G06F 3/045* (2006.01)

(52) U.S. Cl. ............. 349/12; 349/38; 349/139; 345/174

(58) Field of Classification Search .................... 349/12, 349/38, 39, 139, 142, 143; 345/173, 174
See application file for complete search history.

(56) References Cited

U.S. PATENT DOCUMENTS

| | | | |
|---|---|---|---|
| 4,290,052 A * | 9/1981 | Eichelberger et al. | 341/33 |
| 4,743,895 A * | 5/1988 | Alexander | 345/174 |
| 5,459,596 A | 10/1995 | Ueda et al. | 359/59 |
| 5,600,461 A | 2/1997 | Ueda et al. | 349/38 |
| 6,057,903 A * | 5/2000 | Colgan et al. | 349/139 |
| 6,259,490 B1 | 7/2001 | Colgan et al. | 349/12 |
| 2004/0217945 A1 | 11/2004 | Miyamoto et al. | 345/173 |
| 2007/0074913 A1* | 4/2007 | Geaghan et al. | 178/18.06 |
| 2009/0046077 A1* | 2/2009 | Tanaka et al. | 345/174 |

FOREIGN PATENT DOCUMENTS

| | | |
|---|---|---|
| JP | 61-107045 | 7/1986 |
| JP | 5-224813 | 9/1993 |
| JP | 5-324203 | 12/1993 |
| JP | 10-213812 | 8/1998 |
| JP | 2003-99192 | 4/2003 |

OTHER PUBLICATIONS

Microfilm of the specification and drawings annexed to the request of Japanese Utility Model Application No. 191537/1984 (Laid-Open No. 107045/1986), Sharp Corp., (Jul. 7, 1986).
International Search Report for International Application No. PCT/JP2006/319303, mailed Dec. 5, 2006.

* cited by examiner

*Primary Examiner* — Brian Healy
(74) *Attorney, Agent, or Firm* — Nixon & Vanderhye P.C.

(57) ABSTRACT

A display device includes: a first substrate and a second substrate disposed to face each other; a display medium layer interposed between the first substrate and the second substrate; a plurality of pixel electrodes arranged in a matrix between the first substrate and the display medium layer; a first transparent electrode, interposed between the second substrate and the display medium layer, for detecting a touched location; and a second transparent electrode, interposed between the first transparent electrode and the display medium layer, for receiving a display signal. The display device detects the touched location using a capacitive coupling method and displays an image. A shield electrode for suppressing capacitive coupling is formed between the first transparent electrode and the second transparent electrode.

19 Claims, 6 Drawing Sheets

DISPLAY DEVICE

This application is the U.S. national phase of International Application No. PCT/JP2006/319303, filed 28 Sep. 2006, which designated the U.S. and claims priority to Japan Application No. 2006-063093, filed 8 Mar. 2006, the entire contents of each of which are hereby incorporated by reference.

TECHNICAL FIELD

The present invention relates to display devices, and particularly relates to a display device including a capacitive touch panel.

BACKGROUND ART

A touch panel is a device for inputting, with a touch (pressing) of a finger, a stylus, etc., information to an information processing device such as a computer in an interactive manner.

Touch panels are classified by their principle of operation into different types, such as resistive, capacitive, infrared, ultrasonic wave, and electromagnetic induction coupling. Resistive touch panels and capacitive touch panels can be incorporated into display devices, etc., at low cost and are thus widely used in recent years.

A resistive touch panel, which is composed of, for example, a pair of glass substrates disposed to face each other, transparent conductive films provided as resistive films on the entire inner surfaces of the pair of glass substrates, an insulating spacer sandwiched between the pair of glass substrates and forming an airspace between the transparent conductive films, and a touch location detection circuit for detecting touched locations, is placed on the front surface of the display screen of a liquid crystal display panel, for example.

In the resistive touch panel thus configured, with a touch of the front surface of the display screen, the transparent conductive films are brought into contact with each other (making a short circuit) to cause a current to pass between the pair of transparent conductive films. And in this touch panel, the touch location detection circuit detects the touched location in accordance with a variation in voltage occurring when the current passes between the pair of transparent conductive films.

However, the resistive touch panel, in which the pair of transparent conductive films are disposed to face each other with the airspace interposed therebetween, has a drawback in that the airspace causes difference in refractive index to increase, resulting in a reduction in light transmittance.

A capacitive touch panel has the following configuration.

FIG. 12 is a schematic cross-sectional view of a liquid crystal display device 150 including a typical capacitive touch panel.

The liquid crystal display device 150 is composed of: a liquid crystal display panel 100 including an active matrix substrate 110, a counter substrate 120 disposed so as to face the active matrix substrate, and a liquid crystal layer 130 provided between the active matrix substrate 110 and the counter substrate 120; a back light 105 placed under the liquid crystal display panel 100 with a polarizing plate 101 and a diffusion sheet 103 interposed therebetween; and a touch panel 140 placed over the liquid crystal display panel 100 with a polarizing plate 102 interposed therebetween. The touch panel 140 is fixed on the display screen which is the upper side of the liquid crystal display panel 100 by an adhesive layer 104, such as double-faced adhesive tape.

The touch panel 140 includes a glass substrate 141, a location detection transparent electrode 142 provided on the entire surface of the glass substrate 141, location detection electrodes (not shown) disposed on the periphery of the location detection transparent electrode 142 at regular pitches, and a location detection circuit (not shown) for detecting touched locations.

In this touch panel 140, a touch of the front surface of the display screen, i.e., the surface of the glass substrate 141, causes the location detection transparent electrode 142 to be grounded at the touched point through the capacitance of the human body, resulting in a variation in resistance value between each location detection electrode and the grounded point. And in this touch panel 140, the touch location detection circuit detects the touched location in accordance with the variation in resistance value between each location detection electrode and the grounded point.

In this liquid crystal display device 150, the number of glass substrates (111, 121, and 141) is three, which is one less than that in a liquid crystal display device including the above-described resistive touch panel, while the airspace between the pair of transparent conductive films existing in the resistive-touch-panel-equipped liquid crystal display device is not present. The liquid crystal display device 150 thus has excellent light transmittance.

Also, Patent Document 1, for example, discloses a capacitive touch panel that has a configuration in which a first transparent substrate provided with a transparent conductive film for touch location detection is bonded on the touch side thereof to a second transparent substrate for glare prevention by a transparent adhesive. Patent Document 1 describes that this configuration prevents damage to the transparent conductive film while allowing an increase in productivity.

However, a display device which uses the above-described touch panel placed on the front surface of the display screen of the display panel has a problem in that the touch panel itself increases the thickness and weight of the entire device or the cost.

It is therefore known that, in order to reduce the thickness and weight of the device, components included in the display device are also used as the glass substrate and the location detection transparent electrode forming the touch panel, thereby eliminating the need for forming the glass substrate and the location detection transparent electrode.

For example, Patent Document 2 describes a touch sensor and display device in one, in which the display device, which includes an active matrix substrate having a plurality of pixel electrodes arranged in a matrix, and a transparent common electrode that faces the active matrix substrate, is provided with: a liquid crystal display circuit for supplying voltage or current for display to the transparent common electrode; a location detection circuit for detecting currents flowing from a plurality of points in the transparent common electrode; and a switching circuit for electrically connecting one of these circuits with the transparent common electrode.

Also, Patent Document 3 describes a capacitive touch panel, in which a common transparent electrode, a liquid crystal, and a display transparent electrode are sequentially stacked between two transparent insulating plates, current detectors for detecting current flowing between a contact object, such as a finger, and the common transparent electrode through the transparent insulating plate that is disposed close to the common transparent electrode, that displays thereon characters or an image, and that is touched by the contact object, are mounted on the four corners of the common transparent electrode in order to detect the coordinates of the location of the touched part on the transparent insulating plate, and a signal processing circuit is included for calculating the coordinates of the location of the touched part from current signals from the current detectors at the four corners which are affected by a variation in capacitance occurring due to the touch of the contact object on the touched part on the transparent insulating plate.

Patent Document 1: Japanese Laid-Open Publication No. 5-324203

Patent Document 2: Japanese Laid-Open Publication No. 2003-66417

Patent Document 3: Japanese Laid-Open Publication No. 2003-99192

DISCLOSURE OF THE INVENTION

Problem that the Invention Intends to Solve

In Patent Documents 2 and 3 described above, the components included in the display device are also used as the glass substrate and the location detection transparent electrode forming the touch panel, which enables the thickness and cost of the device itself to be reduced but may cause display quality to deteriorate.

This display quality deterioration will be discussed below. In Patent Documents 2 and 3, the common counter electrode and the common transparent electrode need to have both the function of a touch panel electrode for detecting locations and the function of a display electrode for applying voltage to the liquid crystal layer. The common counter electrode and the common transparent electrode are required to have high electrical resistance when functioning as a touch panel electrode, while required to have low electrical resistance when functioning as a display electrode. Specifically, in order to function as a touch panel electrode, the common counter electrode and the common transparent electrode preferably have a surface resistance of about 700 to 2000Ω, while in order to function as a display electrode, the surface resistance of the common counter electrode and the common transparent electrode is preferably from about 30 to 100Ω. If the common transparent electrode has a surface resistance higher than 100Ω, a phenomenon called shadowing occurs, in which shadows extend along displayed characters and patterns, which may cause display quality to decrease.

Therefore, in a liquid crystal display device including a touch panel, a touch panel electrode for detecting locations and a display common electrode for applying voltage to the liquid crystal layer are often formed independently on a counter substrate located close to the display screen.

Nevertheless, in a liquid crystal display device in which a touch panel electrode and a common electrode are formed independently as described above, a display signal input to the common electrode causes a location detection signal in the touch panel electrode to be varied to thereby decrease the location detection accuracy of the touch panel, which may make it difficult to accomplish stable operation of the touch panel.

The present invention was made in view of the foregoing respects, and it is an object of the present invention to achieve a display device capable of stable touch panel operation.

Means for Solving the Problem

In order to achieve the above object, according to the invention, a shield electrode for suppressing capacitive coupling is provided between a first transparent electrode for detecting touched locations and a second transparent electrode for receiving display signals.

Specifically, an inventive display device includes: a first substrate and a second substrate disposed to face each other; a display medium layer interposed between the first substrate and the second substrate; a plurality of pixel electrodes arranged in a matrix between the first substrate and the display medium layer; a first transparent electrode, interposed between the second substrate and the display medium layer, for detecting a touched location; and a second transparent electrode, interposed between the first transparent electrode and the display medium layer, for receiving a display signal, wherein the display device detects the touched location using a capacitive coupling method and displays an image, and a shield electrode for suppressing capacitive coupling between the first transparent electrode and the second transparent electrode is formed between the first transparent electrode and the second transparent electrode.

In the configuration described above, predetermined display signals are input to the pixel electrodes formed over the first substrate and to the second transparent electrode formed over the second substrate, respectively, so as to apply a certain voltage to the display medium layer to display an image, thereby configuring the display device.

Also, with a touch of the surface of the second substrate opposite the display medium layer, the first transparent electrode is grounded at the touched location through the second substrate and the body capacitance of the human who touched the surface, resulting in, e.g., a variation in resistance value between the grounded point and each of location detection electrodes formed in the periphery of the first transparent electrode. And the touched location is detected in accordance with these variations in resistance value, thereby forming the capacitive touch panel.

Furthermore, since the shield electrode for suppressing capacitive coupling between the first transparent electrode for detecting the touched location and the second transparent electrode for receiving the display signal is formed between the first transparent electrode and the second transparent electrode, variation in a location detection signal in the first transparent electrode caused by the display signal input to the second transparent electrode is suppressed. Hence, deterioration of the location detection accuracy of the touch panel is suppressed, thereby enabling stable operation of the touch panel.

It is thus possible to achieve a display device capable of stable touch panel operation.

The shield electrode may be configured so as to be grounded.

In the configuration described above, the shield electrode is connected with ground and thus makes the display signal input to the second transparent electrode less likely to affect the first transparent electrode for detecting the touched location.

The shield electrode may be formed of a transparent conductive film.

In the configuration described above, the shield electrode is transparent and thus can be formed over the entire surface of the second substrate.

The transparent conductive film may be formed of a compound of indium oxide and tin oxide, a compound of indium oxide and zinc oxide, or a compound of indium oxide and magnesium oxide.

In the configuration described above, the shield electrode can be formed of a typical transparent conductive film.

The transparent conductive film may be formed so as to have the same shape as, or a larger size than, the first transparent electrode.

In the configuration described above, it becomes possible to easily form the shield electrode over the second substrate like the first transparent electrode.

The transparent conductive film may be formed so as to have the same shape as, or a larger size than, the second transparent electrode.

In the configuration described above, it becomes possible to easily form the shield electrode over the second substrate like the second transparent electrode.

The shield electrode may be formed between the plurality of pixel electrodes.

In the configuration described above, the shield electrode is formed so as not to overlay the pixel electrodes, so that decrease of the transmittance of the pixels caused by the shield electrode is suppressed.

The shield electrode may be formed in a striped pattern.

In the configuration described above, the shield electrode is formed in a striped pattern between the pixel electrodes, which specifically suppresses the decrease of the transmittance of the pixels caused by the shield electrode.

The shield electrode may be formed in a lattice.

In the configuration described above, the shield electrode is formed in a lattice between the pixel electrodes, which specifically suppresses the decrease of the transmittance of the pixels caused by the shield electrode.

The shield electrode may be formed of a metal film impervious to light.

In the configuration described above, since the shield electrode formed of a metal film impervious to light is provided between the pixel electrodes, decrease of the transmittance of the pixels caused by the shield electrode is suppressed despite the light-blocking effect of the shield electrode.

The metal film may contain at least one metal element which is chromium, titanium, tungsten, molybdenum, tantalum or aluminum.

In the configuration described above, the shield electrode can be formed of a typical metal material.

A first insulating layer may be formed between the shield electrode and the first transparent electrode, and a second insulating layer may be formed between the shield electrode and the second transparent electrode.

In the configuration described above, the first insulating layer provides electrical insulation between the shield electrode and the first transparent electrode, while the second insulating layer provides electrical insulation between the shield electrode and the second transparent electrode, whereby the variation in the location detection signal in the first transparent electrode occurring due to the display signal input to the second transparent electrode is specifically suppressed.

The first insulating layer may include a color filter layer, and the second insulating layer may be an organic insulating layer.

In the configuration described above, the color filter layer provides electrical insulation between the shield electrode and the first transparent electrode. Thus, in the case of a color display device, for example, an insulating layer does not have to be separately formed between the shield electrode and the first transparent electrode. Also, since the shield electrode and the second transparent electrode are electrically insulated from each other by the organic insulating layer, it is possible to achieve the electrical insulation between the shield electrode and the second transparent electrode by a typical synthetic resin or the like. Moreover, even if, as a result of stacking the various thin films on the second substrate, a difference in level is formed on the substrate surface before the formation of the organic insulating layer, the organic insulating layer that can be usually formed thick reduces the level difference thereby allowing the second transparent electrode on the organic insulating layer to be formed more planar. Hence the second transparent electrode in contact with the display medium layer is formed planar to permit the display medium layer to function properly, thereby achieving an improvement in display quality.

The first insulating layer may include an organic insulating layer between the shield electrode and the color filter layer.

In the configuration described above, the first insulating layer between the shield electrode and the first transparent electrode is a multilayer film composed of the color filter layer and the organic insulating layer, which increases the electrical insulation between the shield electrode and the first transparent electrode. In addition, even if, as a result of stacking the various thin films on the second substrate, a difference in level is formed on the substrate surface before the formation of the organic insulating layer, the organic insulating layer that can be usually formed thick reduces the level difference thereby allowing the shield electrode on the organic insulating layer to be formed more planar.

The first insulating layer may include an inorganic insulating layer between the first transparent electrode and the color filter layer.

In the configuration described above, since the first insulating layer between the shield electrode and the first transparent electrode is a multilayer film composed of the color filter layer and the inorganic insulating layer, the electrical insulation between the shield electrode and the first transparent electrode increases. Also, the color filter layer is usually formed of an organic material. Thus, even if the color filter layer contains organic impurities, the inorganic insulating layer formed between the first transparent electrode and the color filter layer suppresses a decrease in location detection accuracy in the first transparent electrode caused by those organic impurities.

The first insulating layer may be an inorganic insulating layer, and the second insulating layer may be composed of a color filter layer formed close to the shield electrode and an organic insulating layer formed close to the second transparent electrode.

In the configuration described above, since the shield electrode and the first transparent electrode are electrically insulated from each other by the inorganic insulating layer, it is possible to achieve the electrical insulation between the shield electrode and the first transparent electrode by a typical inorganic insulating film. Moreover, the shield electrode and the second transparent electrode are electrically insulated from each other by the multilayer film composed of the color filter layer and the organic insulating layer, which increases the electrical insulation between the shield electrode and the second transparent electrode. In addition, even if, as a result of stacking the various thin films on the second substrate, a difference in level is formed on the substrate surface before the formation of the organic insulating layer, the organic insulating layer that can be usually formed thick reduces the level difference thereby allowing the second transparent electrode on the organic insulating layer to be formed more planar. Consequently, the second transparent electrode in contact with the display medium layer is formed planar, which permits the display medium layer to function properly, thereby achieving an improvement in display quality.

A color filter layer may be formed between the second substrate and the first transparent electrode, the first insulating layer may be an inorganic insulating layer, and the second insulating layer may be an organic insulating layer.

In the configuration described above, the inorganic insulating layer provides electrical insulation between the shield electrode and the first transparent electrode, while the organic insulating layer provides electrical insulation between the shield electrode and the second transparent electrode, whereby the variation in the location detection signal in the first transparent electrode occurring due to the display signal input to the second transparent electrode is specifically suppressed. Furthermore, since the color filter layer is formed between the second substrate and the first transparent electrode, color display becomes possible regardless of the configuration of the shield electrode for suppressing capacitive coupling. In addition, even if, as a result of stacking the various thin films on the second substrate, a difference in level is formed on the substrate surface before the formation of the organic insulating layer, the organic insulating layer that can be usually formed thick reduces the level difference thereby allowing the second transparent electrode on the organic insulating layer to be formed more planar. Consequently, the second transparent electrode in contact with the display medium layer is formed planar, which permits the display medium layer to function properly, thereby achieving an improvement in display quality.

An insulating layer may be formed between the first transparent electrode and the color filter layer.

In the configuration described above, if the insulating layer is an inorganic insulating layer, the color filter layer is usually formed of an organic material. Thus, even if the color filter layer contains organic impurities, a decrease in location detection accuracy in the first transparent electrode due to those organic impurities is suppressed by forming the inorganic insulating layer between the first transparent electrode and the color filter layer. On the other hand, in a case where the insulating layer is an organic insulating layer, even if, as a result of forming the color filter layer on the second substrate, a difference in level is formed on the substrate surface before the formation of the organic insulating layer, the organic insulating layer that can be usually formed thick reduces the level difference thereby allowing the first transparent electrode on the organic insulating layer to be formed more planar.

The first substrate and the second substrate may be formed of transparent insulating material.

In the configuration described above, the first substrate and the second substrate are formed of an insulating substrate, such as a glass substrate or a plastic substrate.

Effects of the Invention

According to the invention, a shield electrode for suppressing capacitive coupling is formed between a first transparent electrode for detecting a touched location and a second transparent electrode for receiving a display signal, thereby achieving a display device capable of stable touch panel operation.

BRIEF DESCRIPTION OF DRAWINGS

FIG. 4 is a schematic plan view of location detection electrodes A, B, C and D of the touch panel substrate 20a.

EXPLANATION OF THE REFERENCE CHARACTERS

Figure 1:
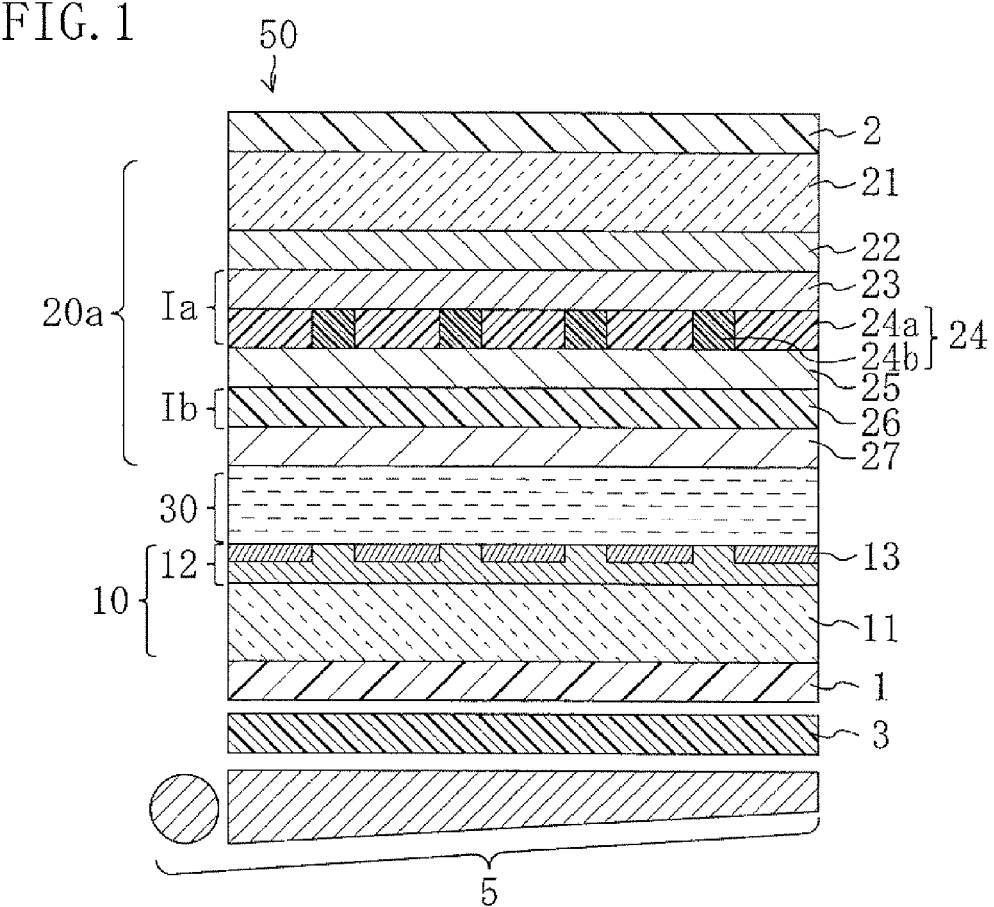
FIG. 1 is a schematic cross-sectional view of a touch panel display device 50 according to a first embodiment.

Ia First insulating layer
Ib Second insulating layer
11 First substrate
13 Pixel electrode
21 Second substrate
22 First transparent electrode
23, 23a, 23b Inorganic insulating layers
24 Color filter layer
24c, 25 Shield electrodes
26, 26a, 26b Organic insulating layers
27 Second transparent electrode
30 Liquid crystal layer (Display medium layer)
50 Liquid crystal display device

BEST MODE FOR CARRYING OUT THE INVENTION

Hereinafter, embodiments of the invention will be described in detail with reference to the accompanying drawings. The following embodiments will be described by taking active-matrix-driven liquid crystal display devices, in which thin film transistors (TFTs) are provided on a one per pixel basis, as examples of display device. It should, however, be noted that the invention is not limited to the following embodiments, but may be applicable to other configurations.

First Embodiment of the Invention

Figure 2:
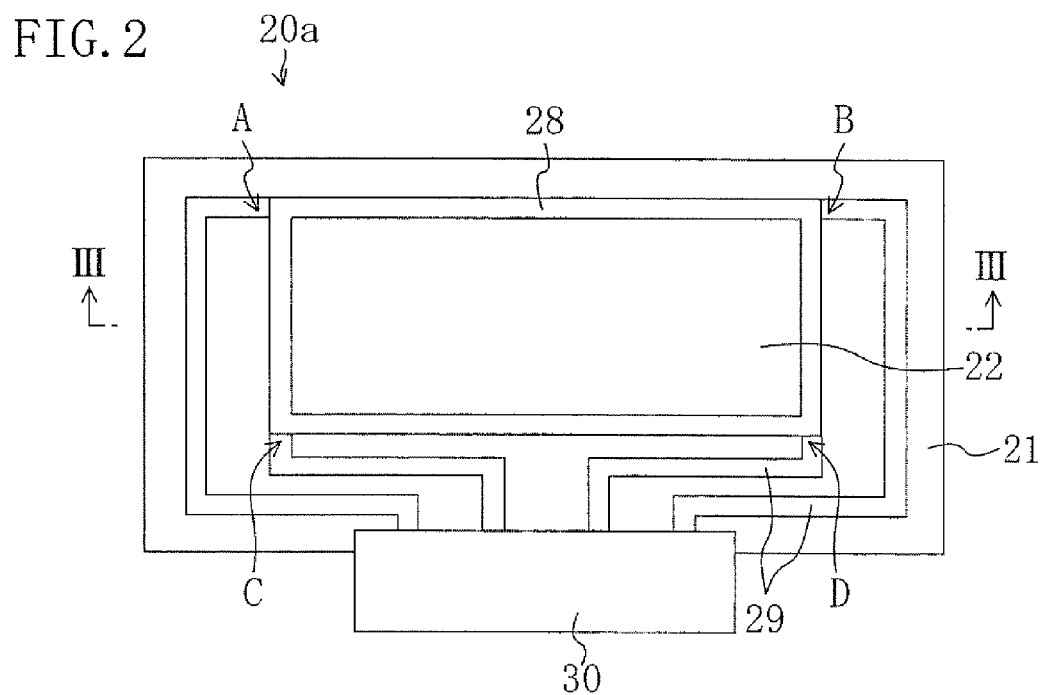
FIG. 2 is a schematic plan view of part of a touch panel substrate 20a included in the liquid crystal display device 50.
Figure 3:
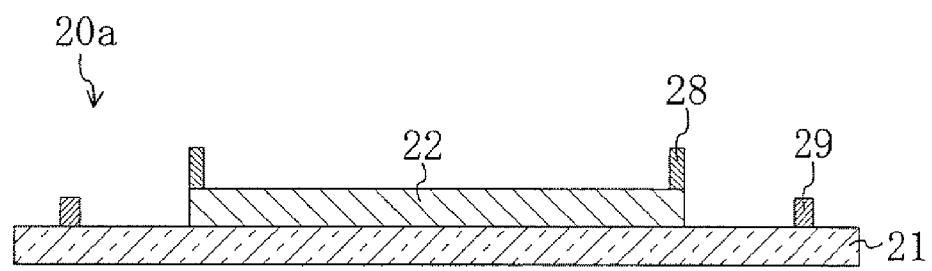
FIG. 3 is a schematic cross-sectional view of the touch panel substrate 20a taken along the line III-III in FIG. 2.

FIGS. 1 to 6 show a liquid crystal display device according to a first embodiment of the invention. Specifically, FIG. 1 is a schematic cross-sectional view of a liquid crystal display device 50 according to this embodiment. FIG. 2 is a schematic plan view of part of a touch panel 20a included in the liquid crystal display device 50, and FIG. 3 is a schematic cross-sectional view taken along the line III-III in FIG. 2.

As shown in FIG. 1, the liquid crystal display device 50 includes: an active matrix substrate 10; a touch panel substrate 20a disposed to face the active matrix substrate 10; a liquid crystal layer 30 as a display medium layer interposed between the active matrix substrate 10 and the touch panel substrate 20a; a back light 5 placed under the active matrix substrate 10 with a polarizing plate 1 and a diffusion sheet 3 interposed therebetween; and a polarizing plate 2 formed on the touch panel substrate 20a.

The active matrix substrate 10 includes a first substrate 11 and a TFT array 12 formed on the first substrate 11.

The TFT array 12 includes: a plurality of gate lines (not shown) formed on the first substrate 11 so as to extend in parallel with each other; a plurality of source lines (not shown) formed so as to extend in parallel with each other in a direction orthogonal to the gate lines; capacitor lines (not shown) formed between the gate lines so as to be in parallel with the gate lines; TFTs (not shown) formed at the intersections of the gate lines and the source lines; and pixel electrodes 13 each formed in an area surrounded by a pair of adjacent gate lines and a pair of adjacent source lines in correspondence to a TFT.

The active matrix substrate 10 has a multilayer stack structure in which a gate insulating film (not shown) and an interlayer insulating film (not shown) are sequentially stacked on the first substrate 11. And the gate lines and the capacitor lines are formed between the first substrate 11 and the gate insulating film. The gate lines have gate electrodes (not shown) projecting in correspondence to the respective TFTs in the direction in which the source lines extend. Formed between the gate insulating film and the interlayer insulating film are a semiconductor layer (not shown) forming the TFTs, and the source lines, source electrodes (not shown), and drain electrodes (not shown), disposed on the semiconductor layer. The source electrodes project from the source lines in correspondence to the respective TFTs in the direction in which the gate lines extend, and the drain electrodes face the source electrodes. The pixel electrodes 13, which are connected to the drain electrodes through contact holes, are formed on the interlayer insulating film. On the pixel electrodes 13, an oriented film is formed. The drain electrodes are extended to the area in which the capacitor lines are arranged, and parts of the drain electrodes facing the capacitor lines function as auxiliary capacitor electrodes. These auxiliary capacitor electrodes, together with the capacitor lines, form auxiliary capacitor through the gate insulating film.

As shown in FIG. 1, the touch panel substrate 20a has a multilayer stack structure in which a first transparent electrode 22, a first insulating layer Ia, a shield electrode 25, a second insulating layer Ib, and a second transparent electrode 27 are sequentially stacked on a second substrate 21.

The first transparent electrode 22 is an electrode for detecting touched locations, and the surface resistance thereof is from 700 to 2000Ω so as to provide sufficient function of a touch panel. Since the surface resistance of the first transparent electrode 22 is from 700 to 2000Ω, a location detection signal is reliably generated in the first transparent electrode 22 and transmitted to a location detection circuit, which will be described later. If, on the other hand, the first transparent electrode 22 has a surface resistance lower than 700Ω or higher than 2000Ω, it is difficult to accurately detect touched locations. The "surface resistance (Ω)", which is electrical resistance per unit area, is also called sheet resistance and also expressed in Ω/□ or Ω/sq. (ohms per square).

The first insulating layer Ia includes an inorganic insulating layer 23 close to the first transparent electrode 22, and a color filter layer 24 close to the shield electrode 25.

The color filter layer 24 includes colored layers 24a corresponding to the pixel electrodes 13 in the active matrix substrate 10 and each colored red, green, or blue, and a black matrix 24b formed between the colored layers 24a.

The second insulating layer Ib is composed of an organic insulating layer 26.

The second transparent electrode 27 is a common electrode to which a display signal is supplied, and the surface resistance thereof is from 30 to 100Ω so as to maintain display quality.

The shield electrode 25 is an electrode for suppressing capacitive coupling between the first transparent electrode 22 and the second transparent electrode 27. The shield electrode 25 is configured so as to be connected to the ground or the like of a circuit in the device and thereby grounded, or so as to receive a signal having a predetermined voltage. With this configuration, capacitive coupling between the first transparent electrode 22 and the second transparent electrode 27 is suppressed, which enables a location detection signal in the first transparent electrode 22 to be reliably transmitted to a location detection circuit, to be described later, thereby increasing the location detection accuracy.

Figure 4:
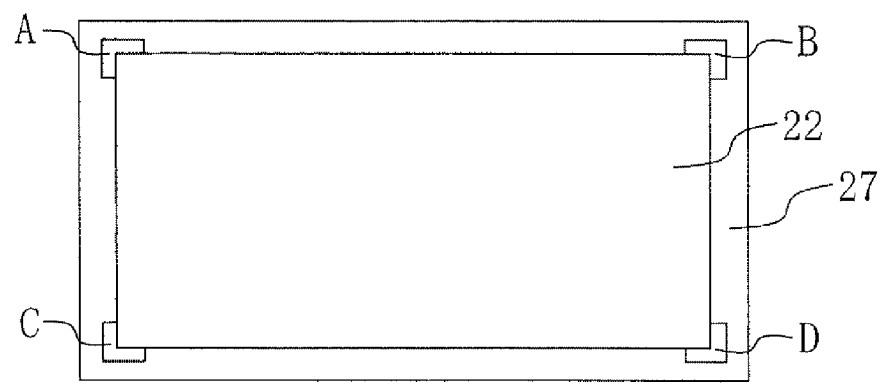

As shown in FIG. 4, the first transparent electrode 22 is formed rectangular and is provided with location detection electrodes A, B, C and D that are electrically connected to the corners thereof.

As shown in FIGS. 2 and 3, the touch panel substrate 20a includes: location detection wires 29 extending from the location detection electrodes A, B, C and D; a location detection wire terminal 30 which is the end of the location detection wires 29; and a frame portion 28 surrounding the periphery of the first transparent electrode 22.

The liquid crystal layer 30 is made of nematic liquid crystal material containing liquid crystal molecules having electrooptical characteristics, or the like.

The liquid crystal display device 50, in which for each pixel electrode 13, a single pixel is formed, is configured in such a manner that, in each pixel, when a gate signal is transmitted from the gate line to turn on the TFT, a source signal is transmitted from the source line to write a certain electric charge into the pixel electrode 13 through the source and drain electrodes, which produces a potential difference between the pixel electrode 13 and the second transparent electrode 27 to thereby apply a certain voltage to the liquid crystal capacitor composed of the liquid crystal layer 30 and to the auxiliary capacitance. And the liquid crystal display device 50 utilizes the fact that the orientation of the liquid crystal molecules changes according to the magnitude of that applied voltage, so as to adjust the transmittance of light incident from the back light 5 to display an image.

Next, operation of the liquid crystal display device 50 as a touch panel will be described.

When the surface of the touch panel substrate 20a, that is, the surface of the polarizing plate 2, is touched by a stylus or a finger, the first transparent electrode 22 is capacitively coupled to the ground (the ground plane) through the human, causing steady-state current to flow in the first transparent electrode 22. The "capacitor" in this case means the sum total of the capacitor between the polarizing plate 2 and the first transparent electrode 22 and the capacitor existing between the human and the ground plane. When, on the other hand, the surface of the touch panel substrate 20a is not touched, voltages of the same magnitude are applied from the location detection electrodes A, B, C and D, whereby steady-state current does not flow in the first transparent electrode 22.

Electrical resistance between the capacitively-coupled touched portion and each of the location detection electrodes A, B, C and D of the first transparent electrode 22 is proportional to the distance between the touched portion and each of the location detection electrodes A, B, C and D. Thus, currents which are proportional to the distances between the touched portion and the location detection electrodes A, B, C and D of the first transparent electrode 22 flow through the location detection electrodes A, B, C and D. By detecting the magnitudes of these currents, the location coordinates of the touched portion are obtainable.

Specifically, with reference to FIG. 5, the basic principle of the location detection procedure using a capacitive coupling method adopted in the invention will be described.

Figure 5:
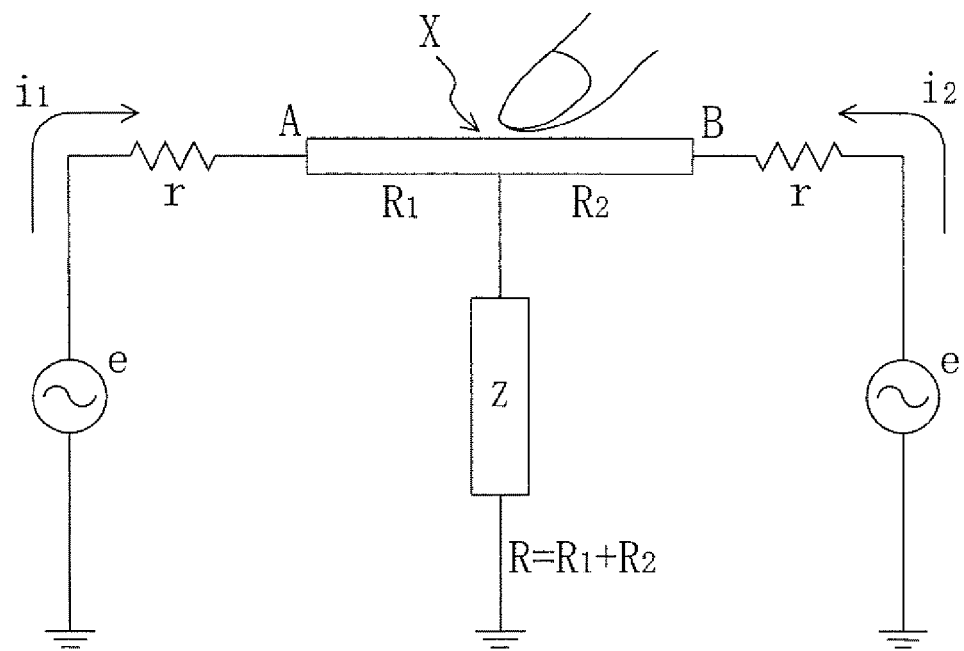
FIG. 5 is a schematic view for explaining the principle of operation of a typical capacitive touch sensor.

For the sake of simplicity, FIG. 5 shows a one-dimensional resistor sandwiched between electrodes A and B. In an actual display device, the two-dimensionally extending first transparent electrode 22 functions in the same manner as this one-dimensional resistor.

Resistors r for current-voltage conversion are connected to the electrodes A and B. The electrodes A and B are connected to a location detection circuit.

Voltages (AC voltages e) having the same phase and the same potential are applied between the electrode A and ground and between the electrode B and ground. At this time, since the electrodes A and B are always of the same potential, no current flows between the electrodes A and B.

And it is assumed that when a location X is touched by a finger, $R=R_1+R_2$ where $R_1$ is the resistance from the location X touched by the finger to the electrode A and $R_2$ is the resistance from the location X to the electrode B. At this time, the following equations hold, where Z is the impedance of the human, $i_1$ is the current flowing in the electrode A, and $i_2$ is the current flowing in the electrode B.

$$e = ri_1 + R_1 i_1 + (i_1+i_2)Z \quad \text{(Equation 1)}$$

$$e = ri_2 + R_2 i_2 + (i_1+i_2)Z \quad \text{(Equation 2)}$$

From the equations (1) and (2), the following equations (3) and (4) are obtained.

$$i_1(r+R_1) = i_2(r+R_2) \quad \text{(Equation 3)}$$

$$i_2 = i_1(r+R_1)/(r+R_2) \quad \text{(Equation 4)}$$

Substitution of the equation (4) into the equation (1) yields the following equation (5).

$$e = ri_1 + R_1 i_1 + (i_1 + i_1(r+R_1)/(r+R_2))Z$$

$$= i_1(R(Z+r) + R_1 R_2 + 2Zr + r^2)/(r+R_2) \quad \text{(Equation 5)}$$

From the equation (5), the following equation (6) is derived.

$$i_1 = e(r+R_2)/(R(Z+r) + R_1 R_2 + 2Zr + r^2) \quad \text{(Equation 6)}$$

In like manner, the following equation (7) is obtained.

$$i_2 = e(r+R_1)/(R(Z+r) + R_1 R_2 + 2Zr + r^2) \quad \text{(Equation 7)}$$

Then, if the ratio between $R_1$ and $R_2$ is expressed by using the entire resistance R, the following equation (8) is obtained.

$$R_1/R = (2r/R+1) i_2/(i_1+i_2) - r/R \quad \text{(Equation 8)}$$

The values of r and R are already known, and hence if the current $i_1$ flowing in the electrode A and the current $i_2$ flowing in the electrode B are obtained by measurement, $R_1/R$ can be determined from the equation (8). It should be noted that $R_1/R$ does not depend on the impedance Z including the human whose finger touched the location X. Therefore, the equation (8) holds unless the impedance Z is zero or infinity, and changes and conditions occurring due to the human and material are negligible.

Figure 6:
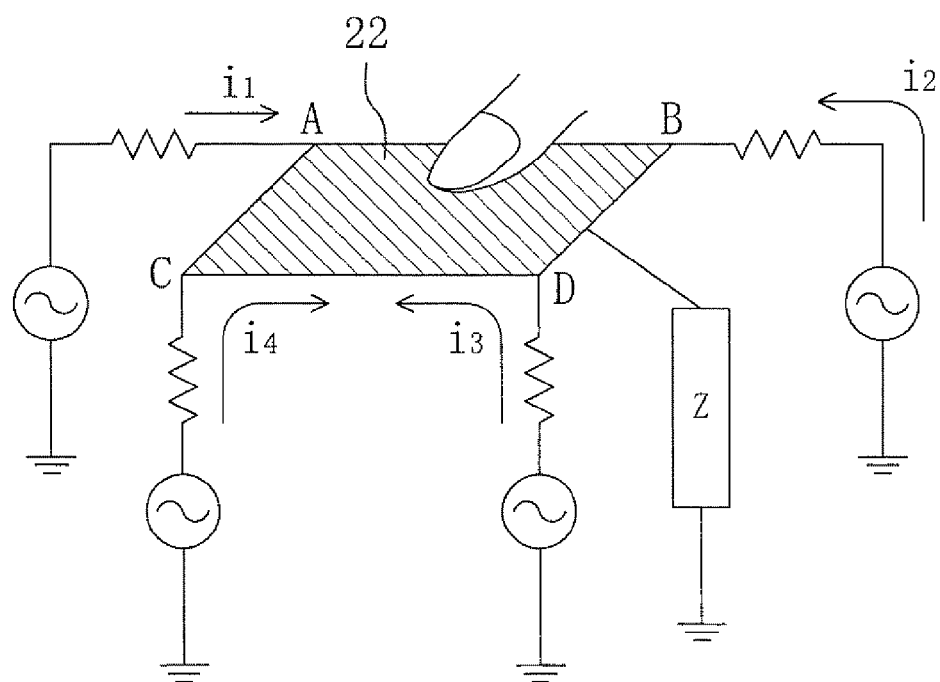
FIG. 6 is a schematic view for explaining the principle of operation of the touch panel in the liquid crystal display device 50.

Next, with reference to FIG. 6, a description will be made of a two-dimensional case to which the relational equations in the one-dimensional case described above have been extendedly applied. As shown in FIG. 4, the location detection electrodes A, B, C and D are formed in the (four) corners of the first transparent electrode 22. These location detection electrodes A, B, C and D are connected to a location detection circuit through the location detection wires 29 and the location detection wire terminal 30.

It is assumed that AC voltages having the same phase and the same potential are applied to the location detection electrodes A, B, C and D and that $i_1$, $i_2$, $i_3$, and $i_4$ are currents flowing through the four corners of the first transparent electrode 22 as a result of a touch of a finger or the like. In this case, the following equations are derived from calculations similar to those described above.

$$X = k_1 + k_2 \cdot (i_2+i_3)/(i_1+i_2+i_3+i_4) \quad \text{(Equation 9)}$$

$$Y = k_1 + k_2 \cdot (i_2+i_3)/(i_1+i_2+i_3+i_4) \quad \text{(Equation 10)}$$

where X is the X coordinate of the touched location on the first transparent electrode 22, Y is the Y coordinate of the touched location on the first transparent electrode 22, $k_1$ is the offset, and $k_2$ is the scaling factor. Both $k_1$ and $k_1$ are constants that are not dependent on the human impedance.

And based on the above-described equations (9) and (10), the touched location can be determined from the measured values of $i_1$, $i_2$, $i_3$, and $i_4$ flowing through the location detection electrodes A, B, C and D.

In the example described above, the electrodes are placed in the four corners of the first transparent electrode 22, and the currents flowing through the respective electrodes are measured to detect the touched location on the two-dimensionally extending surface. Nevertheless, the number of electrodes of the first transparent electrode 22 is not limited to four. At least three electrodes are necessary to detect a two-dimensional location, but the number of electrodes may be increased to five or more to improve the location detection accuracy.

To determine the coordinates of a touched location in accordance with the principle described, it is required to measure the values of currents flowing through the location detection electrodes A, B, C and D placed on the first transparent electrode 22. Next, how to fabricate the liquid crystal display device 50 according to the invention will be described. The fabrication method of this embodiment includes an active matrix substrate preparation process, a touch panel substrate preparation process, and a liquid crystal display panel preparation process.

<Active Matrix Substrate Preparation Process>

First, a metal film made of aluminum or the like (having a thickness of about 1500 Å) is deposited on the entire first substrate 11, which is a glass substrate, a plastic substrate, or the like, by a sputtering process and is then patterned using a photolithography technique (Photo Engraving Process, which will be hereinafter referred to as a "PEP technique"), thereby forming gate lines, gate electrodes, and capacitor lines.

Then a silicon nitride film (having a thickness of about 4000 Å) or the like is deposited on the gate lines, the gate electrodes, and the capacitor lines over the substrate by a CVD (Chemical Vapor Deposition) process, thereby forming a gate insulating film.

Subsequently, an intrinsic amorphous silicon film (having a thickness of about 1500 Å), and an n+ amorphous silicon film (having a thickness of about 400 Å) doped with phosphorus are successively deposited on the gate insulating film over on the substrate by a CVD process and is then patterned into an island shape using a PEP technique, thereby forming a semiconductor layer composed of the intrinsic amorphous silicon layer and the n+ amorphous silicon layer.

And a metal film (having a thickness of about 1500 Å) made of aluminum, titanium or the like is deposited over the gate insulating film having the semiconductor layer formed thereon, by a sputtering process and is then patterned using a PEP technique to form source lines, source electrodes, and drain electrodes.

Then, with the source electrodes and the drain electrodes used as a mask, the n+ amorphous silicon layer is removed by etching to thereby form channel portions.

Furthermore, a photosensitive acrylic resin film (having a thickness of about 3 μm) or the like is applied, by spin coating, to the gate insulating film over the substrate with the source electrodes and the drain electrodes formed over the gate insulating film, thereby forming an interlayer insulating film.

Thereafter, part of the interlayer insulating film corresponding to the drain electrodes is removed by etching to thereby form contact holes.

Subsequently, a transparent conductive film (having a thickness of about 1000 Å) composed of a polycrystalline ITO (Indium Tin Oxide) film is deposited on the interlayer insulating film over the substrate by a sputtering process and is then patterned using a PEP technique, thereby forming pixel electrodes 13.

Finally, a polyimide resin is applied to a thickness of about 500 Å over the substrate having the pixel electrodes 13 formed thereover, and orientation processing is performed on the surface of the polyimide resin by a rubbing method, thereby forming an oriented film.

In the manner set forth above, the active matrix substrate 10, in which the TFT array layer 12 is formed on the first substrate 11, is prepared.

The first substrate 11 has an area extending outwardly from the display area where the pixel electrodes 13 are arranged in a matrix, and driving circuits (a gate driver and a source driver), which drive the TFTs (for the pixels) within the display area to supply certain charge to the pixel electrodes 13, are placed in that extending area. In the preferred embodiment, since the TFTs included in the driving circuits are formed in the same process step as the TFTs for the pixels within the display area, the semiconductor layer is preferably composed of polysilicon films so as to enhance the operating speed of the driving circuits. Moreover, in order to increase the TFTs' operating speed as much as possible, a CGS (Continuous Grain Silicon) film is preferably used to fabricate the TFTs.

<Touch Panel Substrate Preparation Process>

First, a transparent conductive film (having a thickness of about 50 to 150 Å) composed of an amorphous ITO film or IZO (Indium Zinc Oxide) film is deposited on a second substrate 21, which is a glass substrate, a plastic substrate, or the like, by a sputtering process using a mask in such a manner that the transparent conductive film has a surface resistance of from 700 to 2000Ω, thereby forming a first transparent electrode 22. This transparent conductive film may be a polycrystalline ITO film, an $In_2O_3$ film, a film containing Mg and ZnO, or the like, so long as the above-described predetermined surface resistance is obtained.

In this embodiment, since the thickness of the first transparent electrode 22 is from 50 to 150 Å, a location detection signal reliably occurs in the first transparent electrode 22 and is transmitted to the location detection circuit. If, on the other hand, the first transparent electrode 22 has a thickness less than 50 Å, electrical resistance distribution in the first transparent electrode 22 deteriorates, making it difficult to accurately detect touched locations. And if the thickness of the first transparent electrode 22 exceeds 150 Å, the transmittance of the first transparent electrode 22 decreases significantly, which may cause a decline in display quality.

Also, an amorphous ITO film or IZO film typically has higher electrical resistance than a polycrystalline ITO film. Thus in an ordinary case where a second transparent electrode 27, to which a display signal is supplied, is formed of a polycrystalline ITO film, the first transparent electrode 22 for detecting touched locations has higher electrical resistance than the second transparent electrode 27.

Subsequently, a transparent conductive film (having a thickness of about 3000 Å) composed of an ITO film or the like is deposited along the periphery of the first transparent electrode 22 by a sputtering process using a mask in such a manner that the transparent conductive film has a surface resistance of from 3 to 7Ω, thereby forming a frame portion 28.

Furthermore, an Ag alloy (having a thickness of about 3000 Å) is deposited over the substrate having the first transparent electrode 22 and the frame portion 28 formed thereon, by a sputtering process using a mask in such a manner that the Ag alloy has a surface resistance of from 0.15 to 0.3Ω, thereby forming location detection wires 29, location detection electrodes A, B, C and D, and a location detection wire terminal 30.

Thereafter, an inorganic insulating layer 23 (having a thickness of about 1500 Å) composed of an $SiO_2$ film or the like is deposited in the entire region except for the location detection wire terminal 30 by a sputtering process using a mask so as to cover the entire touch panel layer. Then, even if an organic material included in an organic insulating layer next to be formed, i.e., a color filter layer 24, contains organic impurities, it is possible to suppress a decrease in location detection accuracy in the first transparent electrode 22 caused by those organic impurities. It should be noted that if the location detection accuracy of the first transparent electrode 22 is sufficiently high, the inorganic insulating layer 23 does not have to be formed.

Next, a photoresist material or the like containing a black pigment is applied over the substrate having the location detection wires 29, the location detection electrodes A, B, C and D, and the location detection wire terminal 30 formed thereover, to a thickness of about 1 to 2 μm by a printing process and is then patterned using a PEP technique, thereby forming a black matrix 24b.

Then a photoresist material or the like, in which one of either red, green, or blue pigments is suspended, is applied over the substrate having the black matrix 24b formed thereover, to a thickness of about 1 to 3 μm and is then patterned using a PEP technique, thereby forming colored layers 24a having the selected color. And a similar process step is repeated for the other two colors to form the color filter layer 24 in which the colored layers 24a each having a single color are arranged on a one per pixel basis.

Subsequently, a transparent conductive film (having a thickness of about 1500 Å) composed of an amorphous ITO film, IZO film, or the like is deposited over the substrate by a sputtering process using a mask, thereby forming a shield electrode 25. This transparent conductive film may be a polycrystalline ITO film, an $In_2O_3$ film, a film containing Mg and ZnO, or the like. Furthermore, although the shield electrode 25 is formed to a thickness of about 1500 Å as described above, the film thickness may be set so that the shield electrode 25 has a resistance value depending on the panel size. In this step, the shield electrode 25 is formed to have the same shape as, or to have a larger size than, the second transparent electrode 27.

Next, a photosensitive acrylic resin film is applied over the substrate to a thickness of about 30 μm by spin coating and is then patterned using a PEP technique to form an organic insulating layer 26. Then, even if, as a result of stacking the various thin films on the second substrate 21, a difference in level is formed on the substrate surface before the formation of the organic insulating layer 26, the organic insulating layer 26 that can be usually formed thick reduces the level difference thereby allowing the second transparent electrode 27 on the organic insulating layer 26 to be formed more planar. Hence the second transparent electrode 27, which is in contact with a liquid crystal layer through an oriented film (not shown) to be described later, is formed planar to allow the liquid molecules in the liquid crystal layer 30 to be oriented properly, thereby achieving an improvement in display quality.

Furthermore, a transparent conductive film (having a thickness of about 1500 Å) composed of a polycrystalline ITO film or the like is deposited over the substrate by a sputtering process using a mask in such a manner that the transparent conductive film has a surface resistance of from 30 to 100Ω, thereby forming the second transparent electrode 27.

Finally, a polyimide resin is applied to a thickness of about 500 Å over the substrate having the second transparent electrode 27 formed thereover, and orientation processing is performed on the surface of the polyimide resin by a rubbing method, thereby forming an oriented film.

In the manner set forth above, the touch panel substrate 20a is prepared.

<Liquid Crystal Display Panel Preparation Process>

First, a sealing material made of thermosetting epoxy resin or the like is applied, by screen printing, to one of either the active matrix substrate 10 prepared in the active matrix substrate preparation process or the touch panel substrate 20a prepared in the touch panel substrate preparation process, in a frame pattern in which a liquid crystal inlet portion is left open, while a spherical spacer made of resin, silica, or the like and having a diameter corresponding to the thickness of the liquid crystal layer 30 is spread over the other substrate.

Thereafter, the active matrix substrate 10 and the touch panel substrate 20a are bonded together, and the sealing material is cured to form an empty cell.

Subsequently, a liquid crystal material is introduced between the empty-cell active matrix substrate 10 and the touch panel substrate 20a by a dipping method to form the liquid crystal layer 30. An UV curable resin is then applied to the liquid crystal inlet and cured by ultraviolet irradiation to seal the inlet, thereby preparing a liquid crystal display panel.

Next, a polarizing plate 1, a diffusion sheet 3, and a back light 5 are attached to the surface of the prepared liquid crystal display panel on the active matrix substrate 10 side, while a polarizing plate 2 is attached to the surface thereof on the touch panel substrate 20a side.

In this manner, the liquid crystal display device 50 of this embodiment is fabricated.

Next, specific experiments conducted will be discussed.

Specifically, touch panel's location detection accuracy was verified in a case, as an example of the invention, in which a liquid crystal display device 50 configured in the same manner as in the above-described embodiment was prepared and the shield electrode 25 therein was grounded, and in a case, as a comparison example compared with the invention, in which the shield electrode 25 in the touch panel substrate 20a was not formed.

In the liquid crystal display device that did not include the shield electrode 25, the location detection accuracy often varied and thus was low. On the other hand, in the liquid crystal display device in which the shield electrode 25 was grounded, the location detection accuracy increased about three times. It was confirmed from this that the shield electrode 25 formed between the first transparent electrode 22 and the second transparent electrode 27 enabled stable operation of the touch panel.

As described previously, in the liquid crystal display device 50 of this embodiment, predetermined display signals are input to the pixel electrodes 13 formed over the first substrate 11 and to the second transparent electrode 27 formed over the second substrate 21, respectively, so as to apply a predetermined voltage to the liquid crystal layer 30 to display an image, thereby forming a display device.

By touching the surface of the polarizing plate 2 on the second substrate 21, the first transparent electrode 22 is grounded at the touched location through the second substrate 21 and the body capacitance of the person who touched the surface, which causes a variation in resistance value between the grounded point and each of the location detection electrodes A, B, C and D formed in the periphery of the first transparent electrode 22, for example. And the touched location is detected based on these variations in resistance value. In this manner, the capacitive touch panel is configured.

Moreover, since the shield electrode 25 for suppressing capacitive coupling between the first transparent electrode 22 for detecting the touched location and the second transparent electrode 27, to which the display signal is input, is provided between the first transparent electrode 22 and the second transparent electrode 27, it is possible to suppress variation in the location detection signal in the first transparent electrode 22 caused by the display signal input to the second transparent electrode 27. Therefore, the location detection signal generated in the first transparent electrode 22 is reliably transmitted to the location detection circuit, whereby a decrease in the location detection accuracy of the touch panel is suppressed, enabling stable operation of the touch panel. Accordingly, the liquid crystal display device capable of stable touch panel operation is achieved.

In addition, the first transparent electrode 22 for detecting the touched location is configured so as to have higher electrical resistance than the second transparent electrode 27, so that the location detection signal is reliably generated in the first transparent electrode 22 while the display signal is rapidly supplied to the liquid crystal layer 30 through the second transparent electrode 27. Thus, in the liquid crystal display device 50, even with the touch panel function thereof, occurrence of shadowing and hence a decline in display quality are suppressed.

In the example described in this embodiment, the first insulating layer Ia includes the inorganic insulating layer 23 formed close to the first transparent electrode 22 and the color filter layer 24 formed close to the shield electrode 25. In this invention, however, the first insulating layer Ia may be composed of the color filter layer 24 alone. In that case, there is no need for separately forming an insulating layer between the shield electrode 25 and the first transparent electrode 22.

Furthermore, since the shield electrode 25 and the second transparent electrode 27 are electrically insulated from each other by the organic insulating layer 26, it is possible to achieve the electrical insulation between the shield electrode 25 and the second transparent electrode 27 by a typical synthetic resin or the like.

Second Embodiment of the Invention

Figure 7:
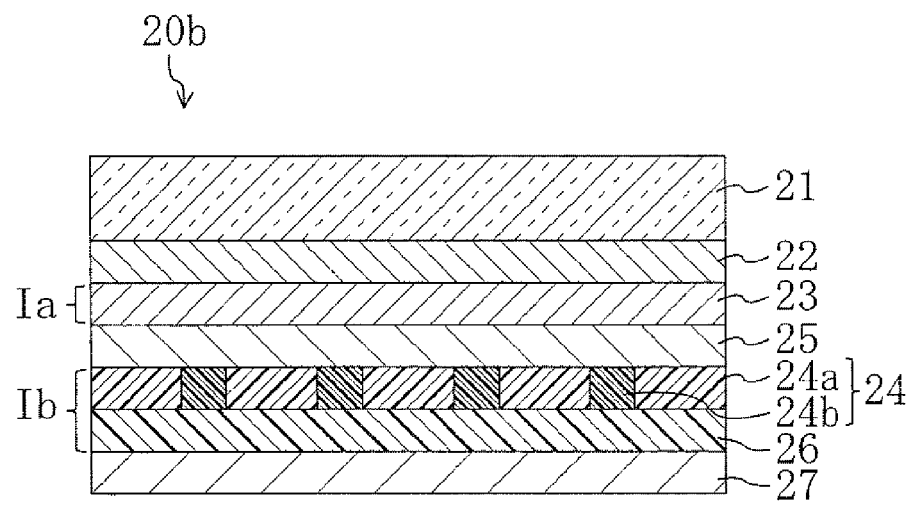
FIG. 7 is a schematic cross-sectional view of a touch panel substrate 20b included in a liquid crystal display device according to a second embodiment.

FIG. 7 is a schematic cross-sectional view of a touch panel substrate 20b included in a liquid crystal display device according to this embodiment. In the following embodiments, the same members as those shown in FIGS. 1 to 6 are identified by the same reference numerals and detailed description thereof will be omitted herein.

The liquid crystal display device of this embodiment includes the touch panel substrate 20b in place of the touch panel substrate 20a of the first embodiment.

In the touch panel substrate 20b, the positional relationship between a color filter layer 24 and a shield electrode 25 is opposite to that in the touch panel substrate 20a of the first embodiment. In the other respects, the configuration of the touch panel substrate 20b is the same as that of the touch panel substrate 20a.

The touch panel substrate 20b is prepared just by interchanging the process step of forming the color filter layer 24 and the process step of forming the shield electrode 25 in the touch panel substrate preparation process of the first embodiment, and thus description of the preparation method of the touch panel substrate 20b will be omitted herein.

In the liquid crystal display device including the touch panel substrate 20b of this embodiment, since the shield electrode 25 is provided between a first transparent electrode 22 and a second transparent electrode 27 as in the liquid crystal display device 50 of the first embodiment, it is possible to suppress deterioration of the location detection accuracy of the touch panel, thereby enabling stable operation of the touch panel.

Furthermore, since the shield electrode 25 and the first transparent electrode 22 are electrically insulated from each other by an inorganic insulating layer 23, it is possible to achieve the electrical insulation between the shield electrode 25 and the first transparent electrode 22 by a typical inorganic insulating film. Moreover, the shield electrode 25 and the second transparent electrode 27 are electrically insulated from each other by a multilayer film composed of the color filter layer 24 and an organic insulating layer 26, which increases the electrical insulation between the shield electrode 25 and the second transparent electrode 27. In addition, even if, as a result of stacking the various thin films on the second substrate 21, a difference in level is formed on the substrate surface before the formation of the organic insulating layer 26, the organic insulating layer 26 that can be usually formed thick reduces the level difference thereby allowing the second transparent electrode 27 on the organic insulating layer 26 to be formed more planar. Consequently, the second transparent electrode 27, which is in contact with a liquid crystal layer 30, is formed planar, which permits the liquid molecules in the liquid crystal layer 30 to be oriented properly, thereby achieving display quality improvement.

Third Embodiment of the Invention

Figure 8:
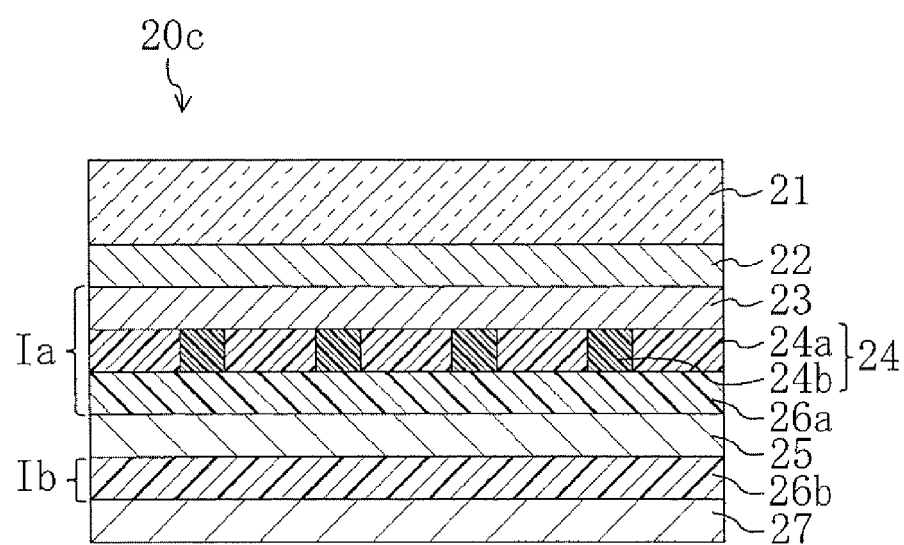
FIG. 8 is a schematic cross-sectional view of a touch panel substrate 20c included in a liquid crystal display device according to a third embodiment.

FIG. 8 is a schematic cross-sectional view of a touch panel substrate 20c included in a liquid crystal display device according to this embodiment.

The liquid crystal display device of this embodiment includes the touch panel substrate 20c in place of the touch panel substrate 20a of the first embodiment.

In the touch panel substrate 20c, which is obtained by forming an organic insulating layer 26a between the color filter layer 24 and the shield electrode 25 in the touch panel substrate 20a of the first embodiment, a shield electrode 25 is sandwiched between a pair of organic insulating layers 26a and 26b. In the other respects, the configuration of the touch panel substrate 20c is the same as that of the touch panel substrate 20a.

In the liquid crystal display device including the touch panel substrate 20c of this embodiment, since the shield electrode 25 is formed between a first transparent electrode 22 and a second transparent electrode 27 as in the liquid crystal display device 50 of the first embodiment, it is possible to suppress deterioration of the location detection accuracy of the touch panel, thereby enabling stable operation of the touch panel.

Also, a first insulating layer Ia between the first transparent electrode 22 and the shield electrode 25 is a multilayer film composed of an inorganic insulating layer 23, a color filter layer 24, and the organic insulating layer 26a, whereby the electrical insulation between the shield electrode 25 and the first transparent electrode 22 is increased. Furthermore, even if, as a result of stacking the various thin films on a second substrate 21, a difference in level is formed on the substrate surface before the formation of the organic insulating layer 26a, the organic insulating layer 26a that can be usually formed thick reduces the level difference thereby allowing the shield electrode 25 on the organic insulating layer 26a to be formed more planar.

Fourth Embodiment of the Invention

Figure 9:
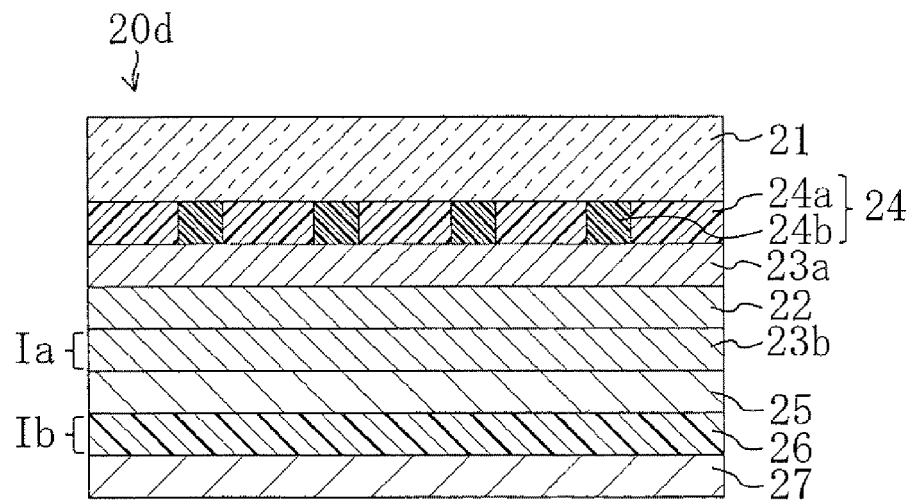
FIG. 9 is a schematic cross-sectional view of a touch panel substrate 20d included in a liquid crystal display device according to a fourth embodiment.

FIG. 9 is a schematic cross-sectional view of a touch panel substrate 20d included in a liquid crystal display device according to this embodiment.

The liquid crystal display device of this embodiment includes the touch panel substrate 20d in place of the touch panel substrate 20a of the first embodiment.

As shown in FIG. 9, the touch panel substrate 20d has a multilayer stack structure in which a color filter layer 24, an inorganic insulating layer 23a, a first transparent electrode 22, an inorganic insulating layer 23b as a first insulating layer Ia, a shield electrode 25, an organic insulating layer 26 as a second insulating layer Ib, and a second transparent electrode 27 are sequentially stacked on a second substrate 21.

Next, how to prepare the touch panel substrate 20d will be described. The touch panel substrate 20d of this embodiment can be prepared by combining the process steps in the touch panel substrate preparation process of the first embodiment, and therefore only a brief description will be provided about the touch panel substrate 20d preparation method.

First, a photoresist material or the like containing a black pigment is applied to a second substrate 21, which is a glass substrate, a plastic substrate, or the like, to a thickness of about 1 to 2 µm by a printing process and is then patterned using a PEP technique, thereby forming a black matrix 24b.

Then, a photoresist material or the like, in which one of either red, green, or blue pigments is suspended, is applied over the substrate having the black matrix 24b formed thereon, to a thickness of about 1 to 3 µm and is then patterned using a PEP technique, thereby forming colored layers 24a having the selected color. And a similar process step is repeated for the other two colors to form a color filter layer 24 in which the colored layers 24a each having a single color are arranged on a one per pixel basis.

Subsequently, an inorganic insulating layer 23a (having a thickness of about 1500 Å) composed of an $SiO_2$ film or the like is deposited over the substrate having the color filter layer 24 formed thereon, by a sputtering process using a mask so as to cover the entire touch panel layer. Then, even if an organic material included in an organic insulating layer later to be formed contains organic impurities, it is possible to suppress a decrease in location detection accuracy in the first transparent electrode 22 caused by those organic impurities.

Furthermore, a transparent conductive film (having a thickness of about 50 to 150 Å) composed of an amorphous ITO film or IZO (Indium Zinc Oxide) film is deposited over the substrate having the inorganic insulating layer 23a formed thereover, by a sputtering process using a mask in such a manner that the transparent conductive film has a surface resistance of from 700 to 2000Ω, thereby forming a first transparent electrode 22.

Thereafter, an inorganic insulating layer 23b (having a thickness of about 1500 Å) composed of an $SiO_2$ film or the like is deposited over the substrate having the first transparent electrode 22 formed thereover, by a sputtering process using a mask so as to cover the entire touch panel layer.

Subsequently, a transparent conductive film (having a thickness of about 1500 Å) composed of an amorphous ITO film, IZO film, or the like is deposited over the substrate by a sputtering process using a mask, thereby forming a shield electrode 25.

Next, a photosensitive acrylic resin film is applied over the substrate to a thickness of about 30 μm by spin coating and is then patterned using a PEP technique, thereby forming an organic insulating layer 26.

Then, a transparent conductive film (having a thickness of about 1500 Å) composed of a polycrystalline ITO film or the like is deposited over the substrate by a sputtering process using a mask in such a manner that the transparent conductive film has a surface resistance of from 30 to 100Ω, thereby forming a second transparent electrode 27.

Finally, a polyimide resin is applied to a thickness of about 500 Å over the substrate having the second transparent electrode 27 formed thereover, and orientation processing is performed on the surface of the polyimide resin by a rubbing method, thereby forming an oriented film.

In this manner, the touch panel substrate 20d is prepared.

In the liquid crystal display device including the touch panel substrate 20d of this embodiment, the shield electrode 25 is formed between the first transparent electrode 22 and the second transparent electrode 27 as in the liquid crystal display device 50 of the first embodiment, whereby deterioration of the location detection accuracy of the touch panel is suppressed, enabling stable operation of the touch panel.

In addition, since the color filter layer 24 is formed between the second substrate 21 and the first transparent electrode 22, color display becomes possible regardless of the configuration of the shield electrode 25 for suppressing capacitive coupling.

In the example described in this embodiment, the inorganic insulating layer 23a is formed between the first transparent electrode 22 and the color filter layer 24. In the invention, however, an organic insulating layer may be formed between the first transparent electrode 22 and the color filter layer 24. Then, even if, as a result of the formation of the color filter layer 24 on the second substrate 21, a difference in level is formed on the substrate surface before the organic insulating layer is formed, the organic insulating layer which can be usually formed thick reduces the level difference thereby allowing the first transparent electrode 22 on the organic insulating layer to be formed more planar.

Fifth Embodiment of the Invention

Figure 10:
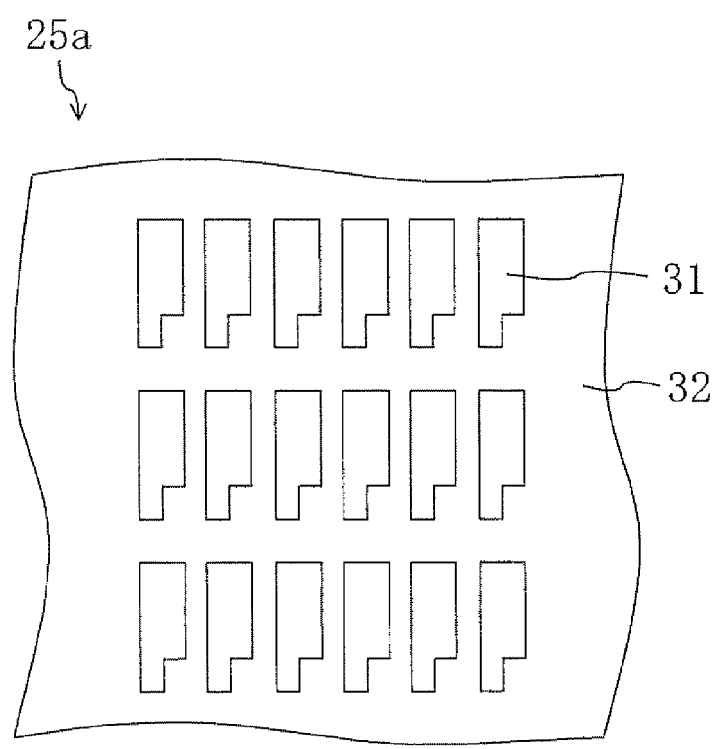
FIG. 10 is a schematic plan view of a shield electrode 25a included in a touch panel substrate in a liquid crystal display device according to a fifth embodiment.

FIG. 10 is a schematic plan view of a shield electrode 25a included in a touch panel substrate in a liquid crystal display device according to this embodiment.

In the foregoing embodiments, the shield electrode 25 is formed over the entire substrate. However, as shown in FIG. 10, a shield electrode 25a according to this embodiment has opening areas 31 opened in correspondence to pixel electrodes 13 in an active matrix substrate 10, and a non-opening area 32 surrounding the opening areas 31.

The shield electrode 25a is formed by patterning a transparent conductive film by a PEP technique when the shield electrode 25 is formed in the touch panel substrate preparation process of the first embodiment. Thus, description of a method for preparing the touch panel substrate including the shield electrode 25a will not be provided herein.

In the touch panel substrate and the liquid crystal display device including the shield electrode 25a of this embodiment, the shield electrode 25a is formed between a first transparent electrode 22 and a second transparent electrode 27 as in the liquid crystal display device 50 of the first embodiment, whereby deterioration of the location detection accuracy of the touch panel is suppressed, enabling stable operation of the touch panel.

Furthermore, since the shield electrode 25a is formed so as not to overlay the pixel electrodes 13 in the active matrix substrate 10, it is possible to suppress decrease of the transmittance of the pixels caused by the shield electrode 25a.

In the example described in this embodiment, the shield electrode 25a is formed in a lattice, but the shield electrode according to the invention may be formed in a striped pattern in a direction in which the gate lines or the source lines in the active matrix substrate 10 extend.

Also, in the example described in this embodiment, the shield electrode 25a is formed of a transparent conductive film. However, in the invention, the shield electrode 25a may be formed of a metal film which is impervious to light and which contains at least one of the metal elements; chromium, titanium, tungsten, molybdenum, tantalum and aluminum. Since the shield electrode 25a is formed so as not to overlay the pixel electrodes 13, decrease of the transmittance of the pixels caused by the shield electrode 25a is suppressed even if the shield electrode 25a is impervious to light.

Sixth Embodiment of the Invention

Figure 11:
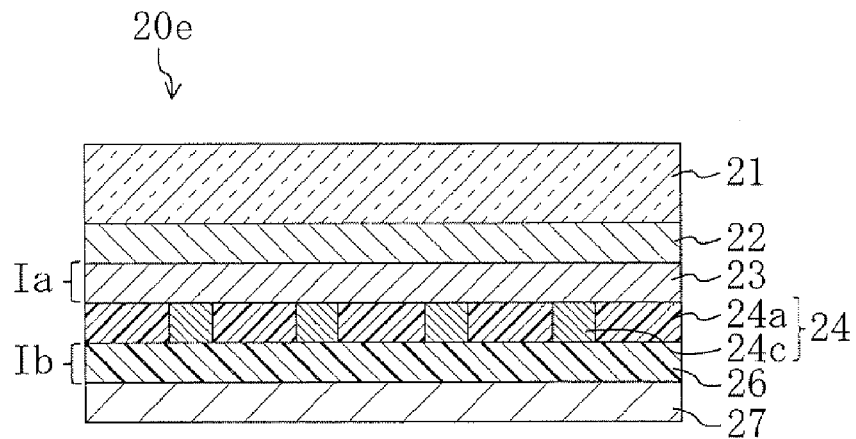
FIG. 11 is a schematic cross-sectional view of a touch panel substrate 20e included in a liquid crystal display device according to a sixth embodiment.
Figure 12:
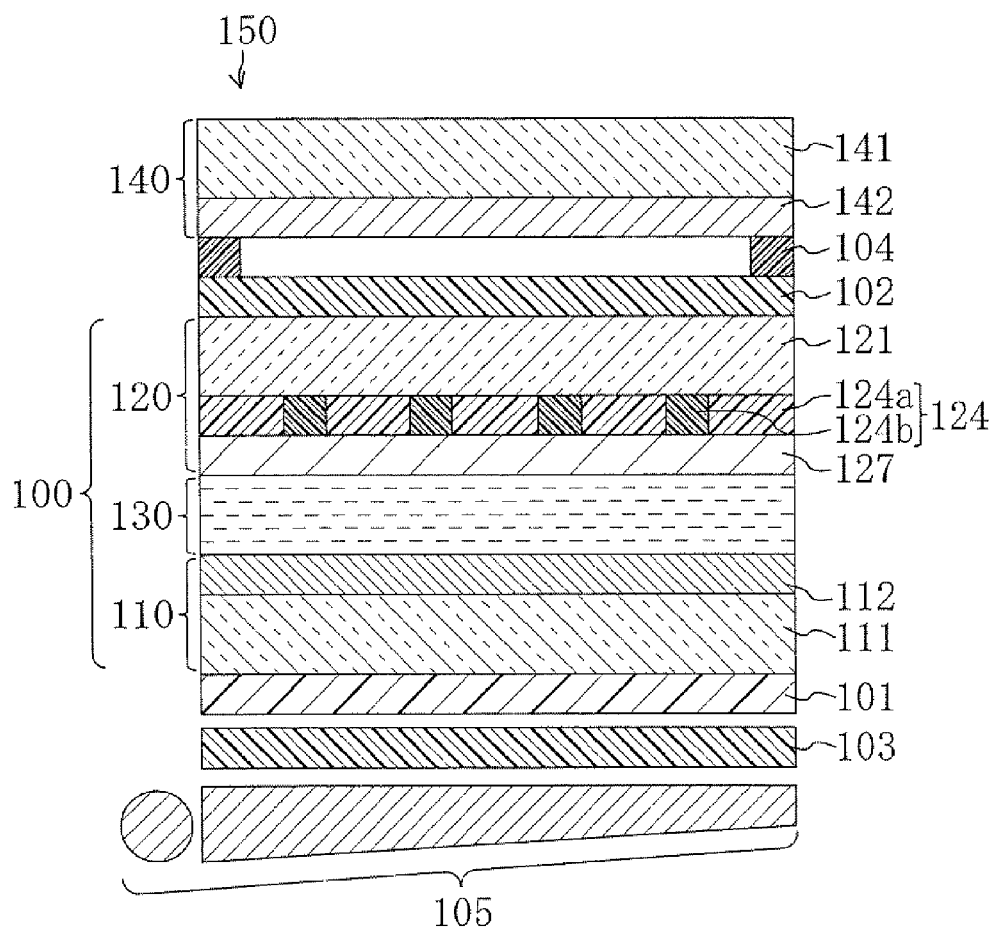
FIG. 12 is a schematic cross-sectional view of a conventional touch panel display device 150.

FIG. 11 is a schematic cross-sectional view of a touch panel substrate 20e included in a liquid crystal display device according to this embodiment. In the foregoing embodiments, the shield electrodes 25 and 25a are formed of a transparent conductive film. In this embodiment, a shield electrode 24c is formed of a metal film impervious to light, while the shield electrode 24c forms a black matrix in a color filter layer 24.

The shield electrode 24c is formed, if, in the step of forming the black matrix 24b in the color filter layer 24 in the touch panel substrate preparation process of the first embodiment, chromium is deposited or a carbon-based material is applied and then patterned using a PEP technique, instead of applying a photoresist material containing a black pigment. Thus, description of a method for preparing the touch panel substrate 20e will not be provided herein. It should be noted that the shield electrode 24c may have not only the single-layer structure of the chromium, the carbon-based material or the like, but also have a two-layer structure in which a chromium compound and chromium are stacked, or a three-layer structure in which another chromium compound is interposed between the chromium compound and the chromium.

In the liquid crystal display device including the touch panel substrate 20e of this embodiment, since the shield electrode 24c is formed between a first transparent electrode 22 and a second transparent electrode 27 as in the liquid crystal display device 50 of the first embodiment, it is possible to suppress deterioration of the location detection accuracy of the touch panel, thereby enabling stable operation of the touch panel.

Moreover, the shield electrode 24c is formed of the black matrix in the color filter layer 24, which allows the touch panel substrate preparation process to be simplified.

INDUSTRIAL APPLICABILITY

As described above, the present invention enables stable touch panel operation within a display device and is thus applicable to display devices into which a touch panel is integrated, such as a car navigation system and a PDA (Personal Digital Assistant).

The invention claimed is:

1. A display device comprising:
    a first substrate and a second substrate disposed to face each other;
    a display medium layer interposed between the first substrate and the second substrate;
    a plurality of pixel electrodes arranged in a matrix between the first substrate and the display medium layer;
    a first transparent electrode, interposed between the second substrate and the display medium layer, for detecting a touched location; and
    a second transparent electrode, interposed between the first transparent electrode and the display medium layer, for receiving a display signal,
    wherein the display device detects the touched location using a capacitive coupling method and displays an image, and
    a shield electrode for suppressing capacitive coupling between the first transparent electrode and the second transparent electrode is formed between the first transparent electrode and the second transparent electrode.

2. The display device of claim 1, wherein the shield electrode is configured so as to be grounded.

3. The display device of claim 1, wherein the shield electrode is formed of a transparent conductive film.

4. The display device of claim 3, wherein the transparent conductive film is formed of a compound of indium oxide and tin oxide, a compound of indium oxide and zinc oxide, or a compound of indium oxide and magnesium oxide.

5. The display device of claim 3, wherein the transparent conductive film is formed so as to have the same shape as, or a larger size than, the first transparent electrode.

6. The display device of claim 3, wherein the transparent conductive film is formed so as to have the same shape as, or a larger size than, the second transparent electrode.

7. The display device of claim 1, wherein the shield electrode is formed between the plurality of pixel electrodes.

8. The display device of claim 7, wherein the shield electrode is formed in a striped pattern.

9. The display device of claim 7, wherein the shield electrode is formed in a lattice.

10. The display device of claim 7, wherein the shield electrode is formed of a metal film impervious to light.

11. The display device of claim 10, wherein the metal film contains at least one metal element which is chromium, titanium, tungsten, molybdenum, tantalum or aluminum.

12. The display device of claim 1, wherein a first insulating layer is formed between the shield electrode and the first transparent electrode, and
    a second insulating layer is formed between the shield electrode and the second transparent electrode.

13. The display device of claim 12, wherein the first insulating layer includes a color filter layer, and
    the second insulating layer is an organic insulating layer.

14. The display device of claim 13, wherein the first insulating layer includes an organic insulating layer between the shield electrode and the color filter layer.

15. The display device of claim 13, wherein the first insulating layer includes an inorganic insulating layer between the first transparent electrode and the color filter layer.

16. The display device of claim 12, wherein the first insulating layer is an inorganic insulating layer, and
    the second insulating layer is composed of a color filter layer formed close to the shield electrode and an organic insulating layer formed close to the second transparent electrode.

17. The display device of claim 12, wherein a color filter layer is formed between the second substrate and the first transparent electrode,
    the first insulating layer is an inorganic insulating layer, and
    the second insulating layer is an organic insulating layer.

18. The display device of claim 17, wherein an insulating layer is formed between the first transparent electrode and the color filter layer.

19. The display device of claim 1, wherein the first substrate and the second substrate are formed of transparent insulating material.

* * * * *